(12) United States Patent
Hoshino

(10) Patent No.: US 9,933,771 B2
(45) Date of Patent: Apr. 3, 2018

(54) MACHINE TOOL HAVING FUNCTION OF SAFETY CONTROLLING PERIPHERAL DEVICES

(71) Applicant: FANUC Corporation, Yamanashi (JP)

(72) Inventor: Yoshinori Hoshino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 286 days.

(21) Appl. No.: 14/837,002

(22) Filed: Aug. 27, 2015

(65) Prior Publication Data

US 2016/0062335 A1 Mar. 3, 2016

(30) Foreign Application Priority Data

Sep. 3, 2014 (JP) ................................. 2014-179082

(51) Int. Cl.
*G05B 19/042* (2006.01)
*G05B 9/02* (2006.01)
*G05B 19/4063* (2006.01)

(52) U.S. Cl.
CPC ........... *G05B 19/0428* (2013.01); *G05B 9/02* (2013.01); *G05B 19/0423* (2013.01); *G05B 19/0425* (2013.01); *G05B 19/4063* (2013.01); *G05B 2219/24015* (2013.01)

(58) Field of Classification Search
CPC ............ G05B 19/0428; G05B 19/0425; G05B 19/0423; G05B 19/0421; G06F 11/1633; G06F 11/1629; G06F 11/1666
See application file for complete search history.

(56) References Cited

U.S. PATENT DOCUMENTS

| 9,651,931 | B2 * | 5/2017 | Hopsecger | G05B 19/0428 |
| 2005/0060605 | A1 * | 3/2005 | Gibart | G05B 9/03 |
| | | | | 714/11 |
| 2006/0123202 | A1 * | 6/2006 | Popescu | G06F 11/1633 |
| | | | | 711/149 |
| 2007/0033195 | A1 * | 2/2007 | Stange | G05B 9/03 |
| 2008/0313426 | A1 * | 12/2008 | Terayama | G05B 19/0428 |
| | | | | 712/29 |
| 2010/0306601 | A1 * | 12/2010 | Kranz | G05B 19/0428 |
| | | | | 714/55 |

(Continued)

FOREIGN PATENT DOCUMENTS

| CN | 102782655 A | 11/2012 | |
| EP | 2413484 A2 * | 2/2012 | ............... G05B 9/03 |

(Continued)

OTHER PUBLICATIONS

Office Action in CN Application No. 201510557527.9, dated Mar. 28, 2017.

(Continued)

*Primary Examiner* — Yolanda L Wilson
(74) *Attorney, Agent, or Firm* — Hauptman Ham, LLP

(57) ABSTRACT

A machine tool includes two independent sequence programs that monitor status of safety signals and first and second CPUs that respectively activate the sequence programs. By a configuration in which the second CPU executes monitoring processing at different execution cycles predetermined for the sequence programs, CPU loads in monitoring of status of safety signals are reduced.

2 Claims, 5 Drawing Sheets

(56) References Cited

U.S. PATENT DOCUMENTS

| | | | | |
|---|---|---|---|---|
| 2011/0246820 A1* | 10/2011 | Murao | ................ | G06F 11/1637 714/10 |
| 2012/0191226 A1* | 7/2012 | Nordberg | ........... | G05B 19/0425 700/79 |
| 2013/0245794 A1* | 9/2013 | Ishii | ........................ | G05B 9/03 700/79 |
| 2013/0290776 A1* | 10/2013 | Grosch | .................... | G05B 9/03 714/10 |

FOREIGN PATENT DOCUMENTS

| | | | | |
|---|---|---|---|---|
| EP | 2525292 A1 * | 11/2012 | .......... | G06F 11/2041 |
| JP | 5-233017 A | 9/1993 | | |
| JP | 5-318277 A | 12/1993 | | |
| JP | 2001-14015 A | 1/2001 | | |
| JP | 2005-227873 A | 8/2005 | | |
| JP | 4300129 B2 | 7/2009 | | |
| JP | 2009-259134 A | 11/2009 | | |
| JP | 2010-262432 A | 11/2010 | | |

OTHER PUBLICATIONS

Office Action in JP Application No. 2014-179082, dated Dec. 1, 2015.

\* cited by examiner

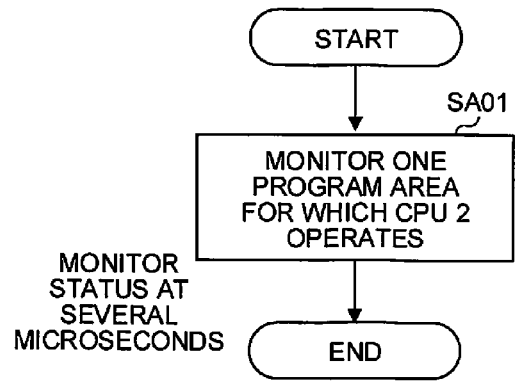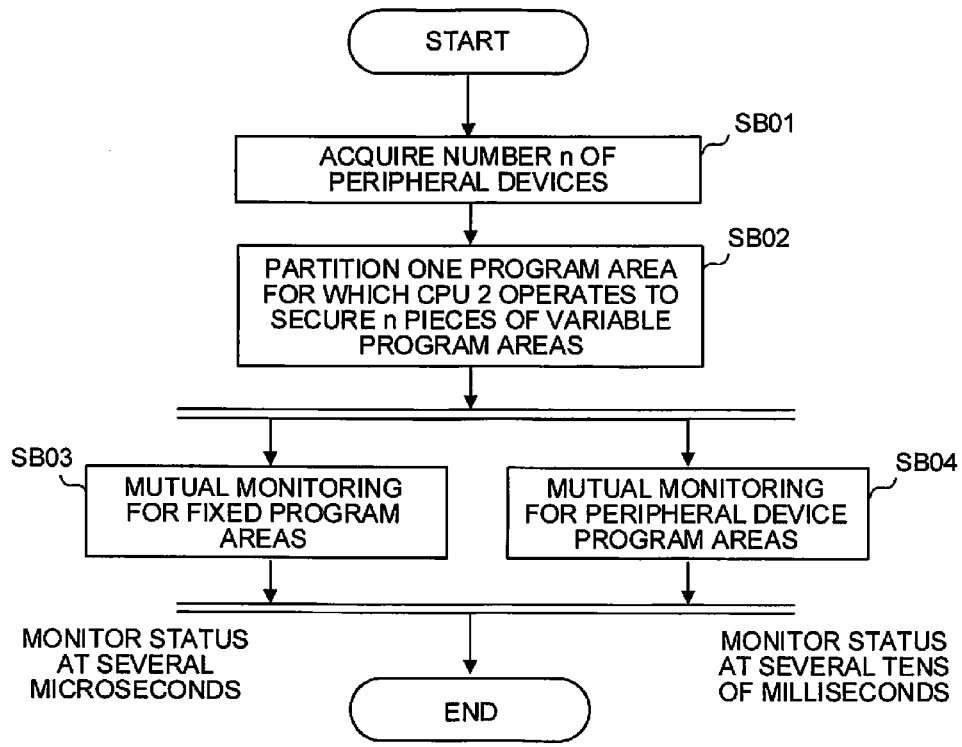

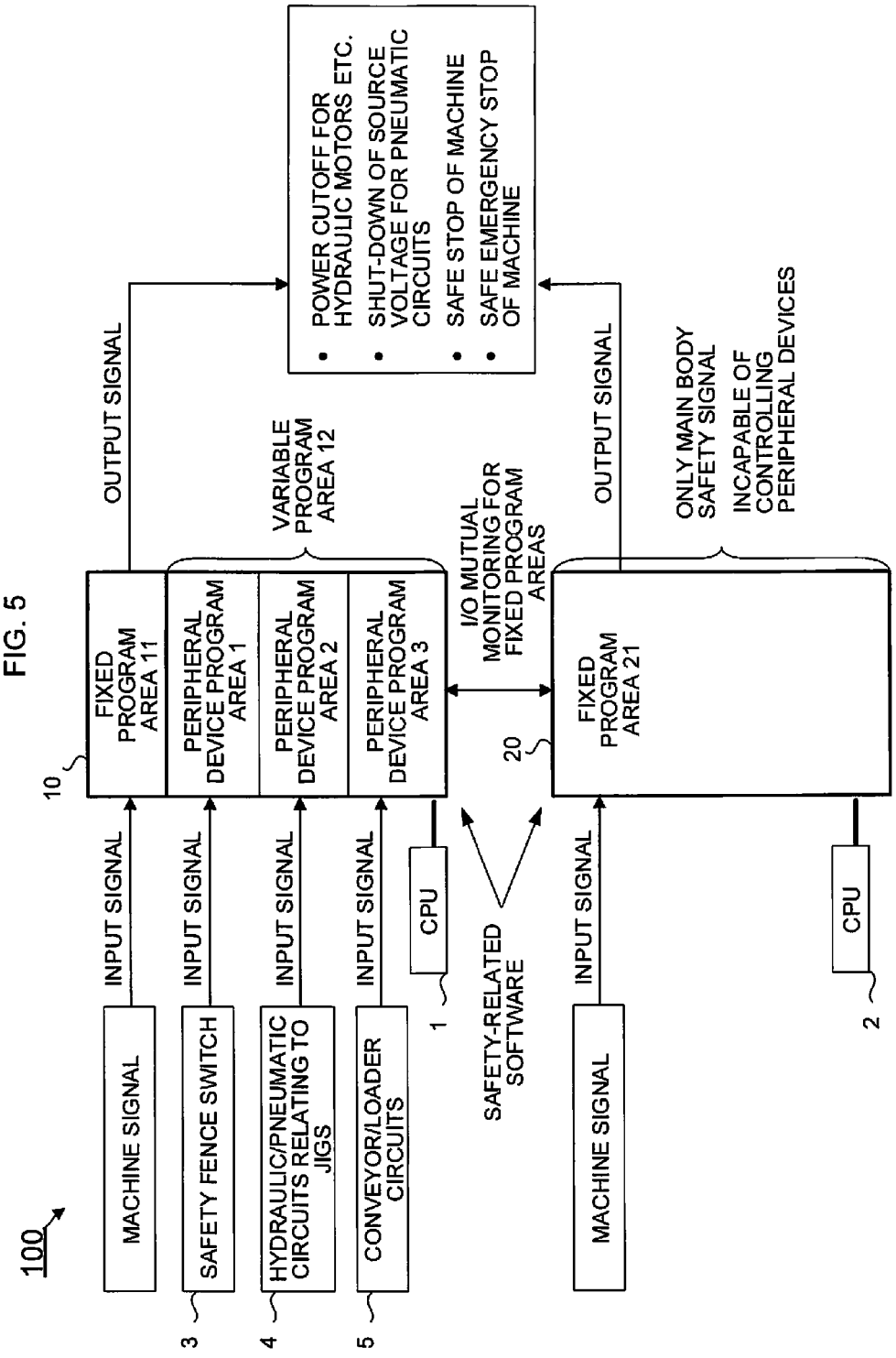

MACHINE TOOL HAVING FUNCTION OF SAFETY CONTROLLING PERIPHERAL DEVICES

RELATED APPLICATIONS

The present application claims priority to Japanese Application Number 2014-179082, filed Sep. 3, 2014, the disclosure of which is hereby incorporated by reference herein in its entirety.

BACKGROUND OF THE INVENTION

1. Field of the Invention

The present invention relates to a machine tool and particularly to a machine tool in which programs relating to peripheral devices fixed to the machine tool can easily be customized afterward by programmable sequence control with safety function (safety sequence ladder) embedded in the machine tool without addition of safety devices, safety sequencers, or the like made of hardware circuits such as safety switches and safety relays in case where safety is desired to be ensured not only for a main body of the machine tool but also for a state including the peripheral devices.

2. Description of the Related Art

In Japanese Patent Application Laid-Open No. 2005-227873, for instance, a programmable sequence controller has conventionally been known that includes embedded safety circuits configured with sequence programs which cannot be modified by users, for minimum safety protection of an operator from a machine tool, and user safety circuits which can freely be modified by the users and that has a built-in safety function which ensures the minimum safety of the operator operating a machine even if the user safety circuits are inappropriate.

In case where safety is desired to be ensured for a state of a machine tool including peripheral devices, conventionally, the peripheral devices can be controlled with addition of safety switches, safety relays, and/or the like and with configuration of safety circuits by hardware, or safety software can be prepared and added by means different from software for a main body with addition of safety sequencers.

There is a technique for ensuring safety in a machine using a plurality of CPUs in which cross-check among program areas that are used respectively by the CPUs is carried out. In a machine in which a plurality of CPUs are used, as illustrated in FIG. 5, for instance, program areas are classified into fixed program areas (sections to be used by a main body of the machine) controlled by a CPU 1 and a variable program area for which programs can freely be prepared by manufacturers of peripheral devices, users, or the like. Programs controlled by a CPU 2 are configured in a fixed program area. A safety function area is included in the fixed program area. For programs of the safety function area controlled by the CPU 2 and programs of a safety area in the CPU 1, cross-check in the fixed program area is carried out so that safety is ensured.

A prior art technique disclosed in Japanese Patent Application Laid-Open No. 2005-227873 described above, however, is a technique for constructing the programmable sequence controller with safety function that enables safety function at an initial design stage for control logic of the machine and has a problem in that it is difficult for manufacturers of peripheral devices to freely arrange and add the control logic of the safety function after completion of the machine.

In the prior art technique in which the safety switches, the safety relays, and/or the safety sequencers are added, the peripheral devices are controlled with the configuration of the safety circuits with the addition of the safety switches, the safety relays, and/or the safety sequencers in case where safety of an operator is required to be ensured for the peripheral devices. The addition of components for securing safety, however, entails much costs and configuration by software may fail to reliably ensure structural safety.

Among safety functions for ensuring safety in a machine using a plurality of CPUs, there are a function of monitoring operations at s short cycle and a function of monitoring safety signal status. Processing in the CPU 2 imposes a heavy burden on the CPU because mutual monitoring processing is carried out at the same cycle for all processes. The CPU 1, which is a CPU dedicated to a programmable machine controller (PMC), has sufficient processing ability, while the CPU 2, which carries out processing in spare time of the CPU for CNC, has insufficient processing ability so that it is difficult to prepare large-volume software therefor.

In case where programs for peripheral devices are added to the variable program area, such a configuration is insufficient as safety circuit because input-output signals for the peripheral devices have a single structure. Compensation for this requires additional hardware circuits, which entail much effort and great cost.

Furthermore, throughput of control software for a numerical controller has been increasing year by year due to attainment of demands for multi-axis, multi-path, and high-functionality features of machine tools and, in particular, increase in throughput for axis control processing due to the multi-axis features has been remarkable. In addition, it has been demanded that default cycle of the axis control processing with nearly real-time characteristic be further shortened for attaining machining with higher speed and higher accuracy and a problem is thereby caused in that greater amount of processing is required to be carried out in shorter period of time as a result.

SUMMARY OF THE INVENTION

An object of the present invention is to provide a machine tool that allows retrofit of peripheral devices with ease and at low cost and that still ensures safety.

A machine tool according to the invention includes two independent sequence programs for safety function that monitor status of safety signals, two storage units in which the sequence programs for safety function are separately saved, and first and second CPUs that respectively activate the sequence programs for safety function.

In a first aspect of the machine tool according to the invention, the storage units each include a fixed program area in which programs cannot be modified and a variable program area in which programs can be added and modified. A peripheral device program area that is partitioned into a plurality of areas is included in the variable program area. The first and second CPUs monitor whether input-output signals that are inputted and outputted with execution of peripheral device programs stored in the respective peripheral device program areas coincide with each other or not. The second CPU executes the sequence programs for safety function at execution cycles predetermined separately for each of the sequence programs for safety function.

In a second aspect of the machine tool according to the invention, the storage units each include a fixed program area in which programs cannot be modified and a variable program area in which programs can be added and modified.

A peripheral device program area that is partitioned into a plurality of areas is included in the variable program area. The first and second CPUs monitor whether input-output signals that are inputted and outputted with execution of peripheral device programs stored in the respective peripheral device program areas coincide with each other or not. The second CPU controls sequence controllers for a plurality of paths having different execution cycles.

In the invention, a variable program area is partitioned into a plurality of areas in which the program areas for the peripheral devices are included, a configuration in which the execution cycles of the plurality of sequence programs for safety function are changed and a configuration which makes it possible for the CPUs to carry out multi-path processing are provided, and the machine tool is thereby provided with a configuration which allows change in the execution cycle for each path. The provision of the configurations makes it possible to provide the machine tool that allows the retrofit of peripheral devices with ease and at low cost and that still ensures safety.

BRIEF DESCRIPTION OF THE DRAWINGS

The above-mentioned and other objects and features of this invention will become apparent from the following description of the embodiment with reference to the accompanying drawings, in which:

FIG. 3A is a flow chart illustrating flow of input-output monitoring processing by a CPU in a state in which no sequence programs for safety function for peripheral devices are added to the machine tool;

FIG. 3B is a flow chart illustrating flow of input-output monitoring processing by the CPU in a state in which sequence programs for safety function for the peripheral devices are added to the machine tool;

FIG. 5 is a schematic block diagram of a machine tool according to a prior art technique and having a safety control function.

DETAILED DESCRIPTION OF THE PREFERRED EMBODIMENTS

Figure 1:
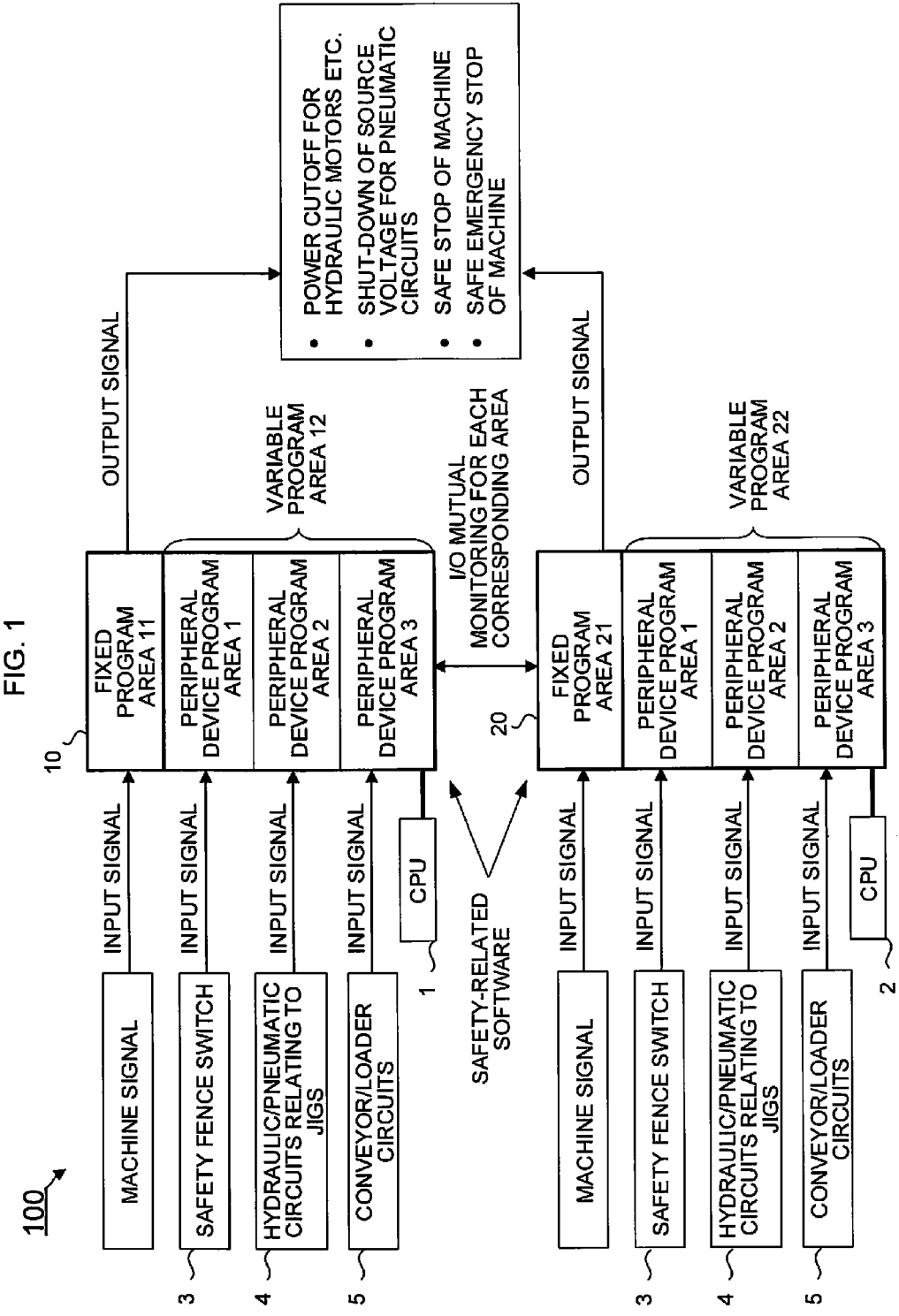
FIG. 1 is a schematic block diagram for an embodiment of a machine tool according to the invention.

An embodiment of a machine tool according to the invention and having a function of safely controlling peripheral devices will be described with reference to FIG. 1.

The machine tool 100 includes two processors, that is, a CPU 1 and a CPU 2, and program areas 10 and 20 that store safety-related software programs to be executed by the CPUs 1 and 2. The program areas 10, 20 are each partitioned into a fixed program area 11, 21 and a variable program area 12, 22.

A sequence program for safety function that is used for control over components of a machine is stored in each of the fixed program areas 11, 21. The CPU 1 and the CPU 2 are capable of processing machine signals inputted from the machine tool by executing the sequence programs for safety function that are stored in the fixed program areas 11, 21 and are configured so that occurrence of a problem in one of the CPUs causes the other CPU to execute safety control.

In each variable program area 12, 22, peripheral device program areas are provided that store sequence programs for safety function which are for a plurality of peripheral devices and which are prepared by manufacturers of the peripheral devices, users, or the like. The one or plurality of peripheral device program areas provided in the one variable program area 12 and the one or plurality of peripheral device program areas provided in the other variable program area 22 are made to correspond to each other and a sequence program for safety function for the same peripheral device is doubly stored in the one variable program area 12 and the other variable program area 22. Even if a problem occurs in one of the CPUs, therefore, the other CPU executes safety control for the peripheral device.

Upon reception of the machine signals from the machine tool (not illustrated), the CPU 1 and the CPU 2 execute the sequence programs for safety function that are stored in the fixed program areas 11, 21, analyze the inputted machine signals, generate output signals for machine components such as hydraulic motors, pneumatic circuits, and motive power, and carry out control such as power cutoff for the hydraulic motors or the like, shut-down of source power supply for the pneumatic circuits, safe stop of the machine, and safe emergency stop of the machine.

Upon reception of input signals from the peripheral devices (not illustrated) such as a safety fence switch 3, hydraulic/pneumatic circuits 4 relating to jigs, and conveyor/loader circuits 5, the CPU 1 and the CPU 2 execute the sequence programs for safety function for the peripheral devices that are stored in (the peripheral device program areas corresponding to the peripheral devices in) the variable program areas 12, 22, analyze various signals inputted by the executed sequence programs for safety function, generate output signals for controlling the machine components, and carry out control such as the power cutoff for the hydraulic motors or the like, the shut-down of the source power supply for the pneumatic circuits, the safe stop of the machine, and the safe emergency stop of the machine.

The CPU 1 and the CPU 2 attain duplication of the safety control by each monitoring whether input signals and output signals for the CPU coincide with input signals and output signals for the other CPU or not. Such mutual monitoring by the two CPUs is carried out for the fixed program areas 11, 21 and each of the peripheral device program areas in the variable program area 12, 22 and thus complete duplication is attained not only for the safety control based on the machine signals but also for the safety control based on each peripheral device.

Figure 2:
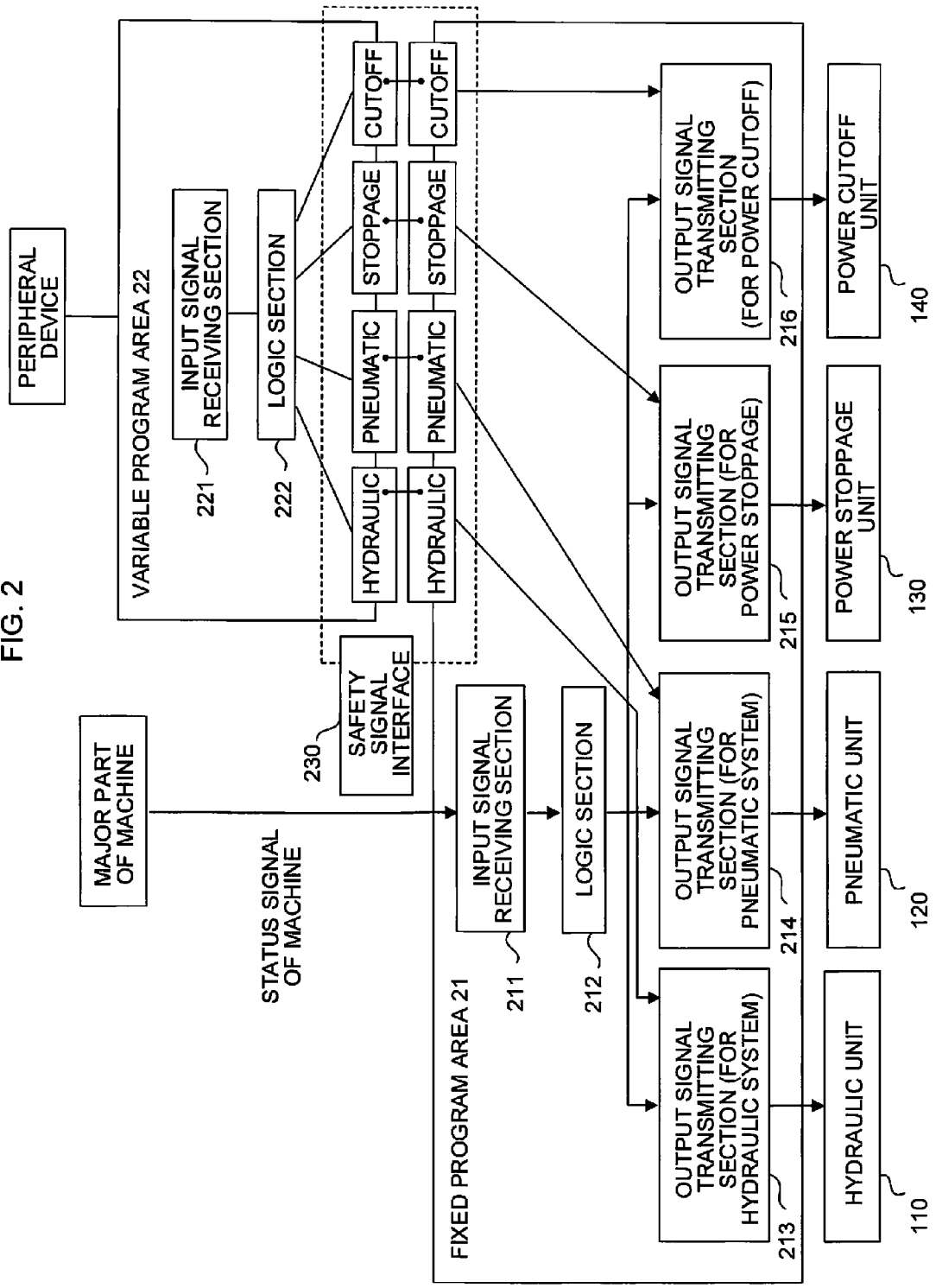
FIG. 2 is a diagram for illustrating relation between a fixed program area and a variable program area in the machine tool of FIG. 1.

FIG. 2 is a diagram for illustrating relation between the fixed program area 11, 21 and the variable program area 12, 22 in the machine tool of FIG. 1.

As described with reference to FIG. 1, the machine tool according to the invention is configured so that the sequence programs for safety function for the peripheral devices which are for the safety control based on the peripheral devices can freely be added by the manufacturers of the peripheral devices, users, or the like. Accordingly, it is necessary to provide a mechanism for outputting output signals, outputted from the sequence programs for safety function for the peripheral devices that are stored in the variable program area 22, to the machine components provided in the machine tool.

In the embodiment of the machine tool according to the invention, therefore, this problem is solved by providing in advance, in the fixed program area 21, a safety signal interface 230 for receiving signals outputted from the variable program area 22 in accordance with specifications of the machine tool.

As illustrated in FIG. 2, signals outputted from a major part of the machine are inputted into an input signal receiving section 211 of the fixed program area 21 and are analyzed by a logic section 212. Based on results of this analysis, signals directed to an output signal transmitting section (for hydraulic system) 213, an output signal transmitting section (for pneumatic system) 214, an output signal transmitting section (for power stoppage) 215, and an output signal transmitting section (for power cutoff) 216 are generated and signals for control from the transmitting sections 213, 214, 215, and 216 to machine components that are a hydraulic unit 110, a pneumatic unit 120, a power stoppage unit 130, and a power cutoff unit 140 are outputted.

On the other hand, signals outputted from the peripheral devices are inputted into an input signal receiving section 221 of the variable program area 22 and are analyzed by a logic section 222. The input signal receiving section 221 and the logic section 222 are functional means that are implemented by the sequence programs for safety function for the peripheral devices that are stored in the peripheral device program areas.

Based on results of analysis by the logic section 222, after that, signals that are directed to the output signal transmitting section (for hydraulic system) 213, the output signal transmitting section (for pneumatic system) 214, the output signal transmitting section (for power stoppage) 215, and the output signal transmitting section (for power cutoff) 216 through the safety signal interface 230 are generated and signals for control from the transmitting sections 213, 214, 215, and 216 to the machine components that are the hydraulic unit 110, the pneumatic unit 120, the power stoppage unit 130, and the power cutoff unit 140 are outputted.

Thus manufacturers of the peripheral devices, users, or the like that prepare the sequence programs for safety function for the peripheral devices are capable of controlling the machine components by preparing programs for output of the signals through the safety signal interface and are capable of freely preparing processing related to the safety control based on the peripheral devices without provision of additional hardware circuits.

As described above, the configurations proposed by the invention make it possible for the manufacturers of the peripheral devices, users, or the like to freely add the sequence programs for safety function for the peripheral devices to the machine tool and make it possible to duplicate the safety control for the machine tool based on added peripheral devices. There is a problem, however, in that much loads are exerted on the CPUs in case where input into and output from the sequence programs for safety function for all the peripheral devices are monitored at the same cycle that input into and output from the sequence programs for safety function that are stored in the fixed program areas 11, 21 are monitored.

In the invention, therefore, the machine tool is configured so that the input into and output from the sequence programs for safety function for the peripheral devices are monitored at predetermined cycles different from the cycle for monitoring for the fixed program areas 11, 21 in accordance with types, importance, and the like of the sequence programs for safety function for the added peripheral devices.

FIG. 3A is a flow chart illustrating flow of input-output monitoring processing by the CPU 2 in a state in which no sequence programs for safety function for peripheral devices are added to the machine tool.

In the state in which no sequence programs for safety function for peripheral devices are added, only the sequence programs for safety function for the fixed program areas 11, 21 are to be monitored by the CPU 2. Therefore, the CPU 2 monitors coincidence between input-output signals for the fixed program area 11 for the CPU 1 and input-output signals for the sequence programs for safety function in the fixed program area 21 for the CPU 2 at a cycle of several microseconds (step SA01).

FIG. 3B is a flow chart illustrating flow of input-output monitoring processing by the CPU 2 in a state in which sequence programs for safety function for peripheral devices are added to the machine tool. Hereinbelow, steps of the flow chart will be described.

[Step SB01] When sequence programs for safety function for peripheral devices are added, number n of the sequence programs for safety function that are to be added for the peripheral devices is acquired. The number n may be acquired based on input from an operator or number of the sequence programs for safety function for the peripheral devices that are read in initialization when the machine tool is started up may be counted.

[Step SB02] The peripheral device program areas numbering in n are secured based on the number n acquired in the step SB01.

[Step SB03] The CPU 2 monitors coincidence between input-output signals for the sequence program for safety function in the fixed program area 11 for the CPU 1 and input-output signals for the sequence program for safety function in the fixed program area 21 for the CPU 2 at a cycle of several microseconds.

[Step SB04] For each of the sequence programs for safety function for the peripheral devices that are stored in the peripheral device program areas, the CPU 2 monitors coincidence between input-output signals for the sequence program for safety function for the peripheral device that is stored in the variable program area 12 for the CPU 1 and input-output signals for the corresponding sequence program for safety function for the peripheral device that is stored in the variable program area 22 for the CPU 2 at a cycle predetermined in accordance with importance, type, and the like determined for the sequence program for safety function for the peripheral device.

In the flow chart of FIG. 3B, the monitoring of the input-output signals for the sequence program for safety function for each peripheral device is described as being carried out at the predetermined cycle (several tens of milliseconds). The cycle, however, may dynamically be regulated in accordance with the load exerted on the CPU and priority based on the importance, type, and the like determined for the sequence program for safety function for the peripheral device.

Thus the loads of the monitoring processing by the CPUs can be relieved by differentiation between the monitoring cycle for the input into and output from the sequence programs for safety function for the machine tool that are stored in the fixed program areas and the monitoring cycle for the input into and output from the sequence program for safety function for each peripheral device.

By provision of the configurations described above for the machine tool, the safety control over the machine tool based on the added peripheral devices can be duplicated without increase in the loads on the CPUs. Application of the configurations may make it possible to simultaneously carry out multi-path safety control without increase in the loads related to the safety control on the CPUs.

Figure 4A:
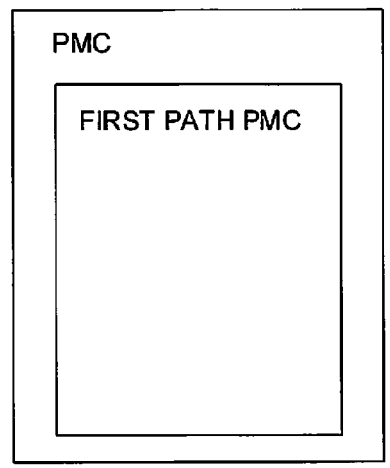
FIG. 4A is a conceptual diagram for safety control in which a CPU is operated as a PMC for one path.

FIG. 4A is a conceptual diagram for safety control in which a CPU is operated as a PMC for one path as done conventionally.

Figure 4B:
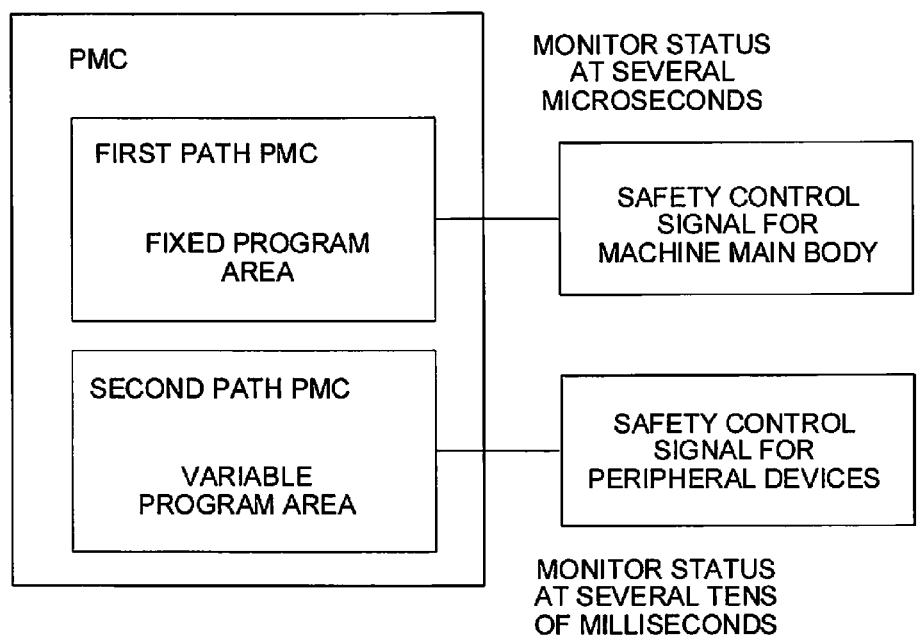
FIG. 4B is a diagram illustrating a configuration of the machine tool according to the invention in which processing time (such as monitoring cycle) can be set for each path.

By contrast, the invention is configured as illustrated in FIG. 4B so that processing time (such as monitoring cycle) can be set for each path. Such a configuration makes it possible to monitor status of safety control at a cycle predetermined for each path and thus makes it possible to attain multi-path monitoring without increase in the loads on the CPUs.

The invention claimed is:

1. A machine tool, comprising:
two independent sequence programs for safety function to monitor status of safety signals;
two storage units in which the sequence programs for safety function are separately saved; and
first and second CPUs to respectively activate the sequence programs for safety function,
wherein the storage units each include
a fixed program area in which programs are not modifiable, and
a variable program area in which programs are addable and modifiable,
wherein the sequence programs for safety function for controlling over components of the machine tool are stored in advance in the fixed program area,
wherein a peripheral device program area that is partitioned into a plurality of areas is included in the variable program area,
wherein the first and second CPUs are configured to monitor whether input-output signals that are inputted and outputted with execution of peripheral device programs stored in the respective peripheral device program areas coincide with each other or not, and
wherein the second CPU is configured to execute the sequence programs for safety function at execution cycles predetermined separately for each of the sequence programs for safety function.

2. A machine tool, comprising:
two independent sequence programs for safety function to monitor status of safety signals;
two storage units in which the sequence programs for safety function are separately saved; and
first and second CPUs to respectively activate the sequence programs for safety function,
wherein the storage units each include
a fixed program area in which programs are not modifiable, and
a variable program area in which programs are addable and modifiable,
wherein the sequence programs for safety function for controlling over components of the machine tool are stored in advance in the fixed program area,
wherein a peripheral device program area that is partitioned into a plurality of areas is included in the variable program area,
wherein the first and second CPUs are configured to monitor whether input-output signals that are inputted and outputted with execution of peripheral device programs stored in the respective peripheral device program areas coincide with each other or not, and
wherein the second CPU is configured to control sequence controllers for a plurality of paths having different execution cycles.

* * * * *